Patented Dec. 8, 1936

2,063,420

UNITED STATES PATENT OFFICE 2,063,420

HALOGENATED ANTHRAQUINONE COMPOUNDS

William Dettwyler, Milwaukee, Wis., assignor to E. I. du Pont de Nemours & Company, Wilmington, Del., a corporation of Delaware No Drawing. Application May 24, 1935, Serial No. 23,254

5 Claims. (Cl. 260—57)

This invention relates to the preparation of new alpha, alpha, beta, beta-tetrahalogen-anthraquinones and to a new process for the preparation of these compounds.

It is known that 1,4,5,8-tetrahalogen-anthraquinone can be prepared by direct halogenation of anthraquinone or by replacement of halogen for nitro groups in dichloro-dinitro-anthraquinone or similar chloro-nitro-anthraquinone bodies. Tetrahalogen-anthraquinone compounds containing halogen in both alpha and beta positions, however, cannot be produced by direct halogenation. It is therefore an object of this invention to prepare new alpha,alpha,beta,beta-tetrahalogen-anthraquinone compounds which are valuable dyestuff intermediates. I have found that such tetrahalogen-anthraquinone compounds containing halogen in both alpha and beta positions may be prepared by the halogenation of 1,5-, 1,8-, 2,6- and 2,7-diamino-anthraquinones by introducing four halogen atoms into the molecule, and then removing the amino groups by diazotization and reduction of the diazo radical. The halogenation of the diaminoanthraquinone compound may be effected by any known method. Chlorination, however, is preferably carried out in hydrochloric acid of from 15 to 32% concentration by means of chlorine gas or by use of an oxidizing agent, which with the hydrochloric acid will produce chlorine, such as for instance sodium or potassium chloride.

The following examples are given to more fully illustrate my invention, in which parts used are by weight.

Example 1

Dissolve 50 parts of 2,6-diamino-1,3,5,7-tetrabromo-anthraquinone (obtained by bromination of 2,6-diamino-anthraquinone in 10% sulfuric acid) in 500 parts of sulfuric acid 96% and diazotize at 20–25° with 20 parts of sodium nitrite. When the diazotization is complete, add slowly below 40° C. 300 parts of ice. Then pour the mass into 4000 parts of cold water and add 650 parts of alcohol and 20 parts of cuprous oxide (freshly prepared) as a paste. Heat slowly to 90° C. and hold for 2 hours. The first red solution changes gradually to an orange and precipitates an orange body, which on further heating turns to yellow. Filter and wash the cake and extract with dilute nitric acid to remove any copper salt.

The resulting 1,3,5,7 - tetrabromo - anthraquinone may be further purified over the oxonium salt.

Example 2

Dissolve 100 parts of 2,6-diamino-1,3,5,7-tetrachloro-anthraquinone (obtained by the chlorination of 2,6-diamino-anthraquinone with sodium chlorate in a 30% hydrochloric acid solution) in 800 parts of sulfuric acid 96%. Then diazotize with 40 parts of sodium nitrite. When the diazotization is complete, add 300 parts of ice below 40° C. and then dilute into 4000 parts of cold water, add 1200 parts of alcohol and 40 parts of cuprous oxide (freshly prepared) as a paste, heat to 90° C. and hold 2 hours. The first red colored liquor turns to a yellow, as the reduction proceeds.

Filter off the tetrachloro-anthraquinone and extract the cake with dilute nitric acid to remove any copper. This copper extraction can also be accomplished by adding sodium chloride and sodium chlorate to the finished reduction mass. The tetrachloro-anthraquinone so obtained is a yellow compound, soluble in concentrated sulfuric acid with a yellow color and soluble in most organic solvents. It can be purified by fractionation from sulfuric acid or crystallization from a mixture of acetic acid and a small amount of nitrobenzene, from which brown needles are obtained.

Example 3

Dissolve 35 parts of 1,8-diamino-2,4,5,7-tetrachloroanthraquinone (obtained by chlorination of 1,8-diamino-anthraquinone in hydrochloric acid) in 300 parts of sulfuric acid and diazotize with 14 parts of sodium nitrite, dilute the diazo into 1200 parts of cold water and add 300 parts of alcohol and 10 parts of cuprous oxide (freshly prepared) as a paste. Heat to 90° and hold 2 hours. Filter the yellow precipitate and remove undissolved copper salts with dilute nitric acid.

The yellow product obtained is the 1,3,6,8-tetrachloro-anthraquinone.

Example 4

By using the 1,5-diamino-2,4,6,8-tetrachloroanthraquinone or tetrabromo-anthraquinone as starting material the 1,3,5,7-tetrachloro- or tetrabromo-anthraquinone may also be obtained.

Example 5

The 2,7-diamino-1,3,6,8-tetrachloro- or tetrabromo-anthraquinone gives on diazotization and reduction the 1,3,6,8-tetrabromo- or tetrachloroanthraquinone which is described in Example 3.

Example 6

Dissolve 100 parts of 1,5-dichloro-2,6-diamino-3,7-dibromo-anthraquinone in 800 parts of sulfuric acid 96% and diazotize at 20-25° with 40 parts of sodium nitrite. When diazotization is complete, pour the whole into 4000 parts of ice and water and add 1000 parts of alcohol and a solution of cuprous oxide freshly prepared from 40 parts of copper sulfate. Then heat to 90-95° C. and hold for 2 hours, whereby the dichloro-dibromo-anthraquinone precipitates out. This is isolated by filtration. It is a yellow powder, soluble in concentrated sulfuric acid and in most organic solvents with a yellow color.

Diazotization and reduction of the diazo group may be effected by any of the known methods.

I claim:

1. Compounds of the formula

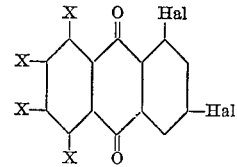

wherein 2 of the X's in meta position to each other stand for halogen and the remaining X's stand for hydrogen.
2. 1,3,5,7-tetrahalogen-anthraquinone.
3. 1,3,6,8-tetrahalogen-anthraquinone.
4. 1,3,5,7-tetrachloro-anthraquinone.
5. 1,3,5,7-tetrabromo-anthraquinone.

WILLIAM DETTWYLER.